United States Patent [19]

Falk et al.

[11] Patent Number: 4,687,373
[45] Date of Patent: Aug. 18, 1987

[54] COMPOSITION TO ENCAPSULATE TOXIC METAL AND/OR ORGANIC POLLUTANTS FROM WASTES

[75] Inventors: Charles D. Falk, Marlboro; Lincoln R. Davis, Lincroft, both of N.J.

[73] Assignee: Lopat Industries, Inc., Wanamassa, N.J.

[21] Appl. No.: 902,204

[22] Filed: Aug. 29, 1986

Related U.S. Application Data

[63] Continuation-in-part of Ser. No. 865,427, May 21, 1986, abandoned.

[51] Int. Cl.$^4$ .............................................. C02F 1/52
[52] U.S. Cl. .................................... 405/128; 106/74; 106/78; 210/710; 210/751; 405/263
[58] Field of Search ............... 405/128, 129, 263, 264; 106/74, 76, 78, 84, 97, 900; 210/751, 723, 667, 721, 710; 166/293, 285

[56] References Cited

U.S. PATENT DOCUMENTS

| | | | |
|---|---|---|---|
| 2,784,060 | 3/1957 | Santmyers | 106/84 X |
| 3,837,872 | 9/1974 | Conner | 106/84 X |
| 3,841,102 | 10/1974 | Conner et al. | 405/128 |
| 3,980,558 | 9/1976 | Thompson | 210/751 |
| 4,116,705 | 9/1978 | Chappell | 210/751 |
| 4,227,932 | 10/1980 | Leah et al. | 106/84 |
| 4,336,142 | 6/1982 | Bye | 405/263 X |
| 4,404,105 | 9/1983 | de Lockerente et al. | 106/76 X |
| 4,432,666 | 2/1984 | Frey et al. | 405/129 |
| 4,465,518 | 8/1984 | Miyoshi et al. | 106/97 |
| 4,586,959 | 5/1986 | Rivoallon | 106/84 |
| 4,600,514 | 7/1986 | Conner | 106/84 X |
| 4,601,832 | 7/1986 | Hooykaas | 405/129 X |

*Primary Examiner*—Dennis L. Taylor
*Attorney, Agent, or Firm*—Gottlieb, Rackman & Reisman

[57] ABSTRACT

A coating composition for treating solid wastes is described and includes an aqueous silicate solution containing potassium oxide and silicon dioxide, a catalytic amount of an aqueous sodium borate solution and a fixative containing solid calcium oxide. A fumed silica may be added to either the aqueous silicate solution or sodium borate solution.

13 Claims, No Drawings

COMPOSITION TO ENCAPSULATE TOXIC METAL AND/OR ORGANIC POLLUTANTS FROM WASTES

BACKGROUND OF THE INVENTION

This application is a continuation-in-part of application Ser. No. 865,427, filed May 21, 1986, now abandoned.

This invention relates to compositions which can be used to treat solid waste materials and the like, wastes such as soils which have become contaminated with toxic metal pollutants and/or organic compounds, such as PCB's and which must be safely discarded. Specifically, this invention relates to a material which can be used to treat soils and other solid wastes which have become contaminated with toxic metals and/or organics.

It is well-known that our industrial society produces solid wastes such as soils that have become contaminated with various pollutants. In particular, toxic metals such as lead are widely known as soil pollutants or contaminants. For example, in areas where junk metals are processed or recovered, such as in the so-called junk yards, the soil associated therewith becomes highly contaminated with lead and/or PCB's. Over a period of time, this is highly undesirable since workers associated with these yards can be exposed to this source of lead and serious side effects can occur at a later date. It is desirable, therefore, to be able to remove this soil from time-to-time and to dispose of it in an ecologically safe manner. Other solid wastes that can contain or be contaminated with toxic metals are also known and these too must be safely disposable. This is not possible using prior art methods since the waste is still contaminated with the pollutant and disposal is a serious problem.

Accordingly, it is an object of the invention to provide a composition which can be used to treat contaminated soils or other solid waste.

It is a further object of the invention to provide a composition that is particularly useful in treating soil or waste contaminated with a toxic metal such as lead and/or contaminated with organic compounds, such as PCB's.

It is another object of the invention to provide a composition which can be used to treat toxic metals and/or organic compounds in soil or waste so that said soil or waste can be disposed of in a ecologically safe manner.

Still other objects and advantages of the invention will, in part, be obvious and will, in part, be apparent from the specification.

SUMMARY OF THE INVENTION

Generally speaking, in accordance with the invention, a coating composition for treating solid waste is provided. The composition includes an aqueous silicate solution containing potassium oxide and silicon dioxide and a fixative containing solid calcium oxide. The composition may also include a catalytic amount of an aqueous sodium borate solution. A fumed silica may be added to either the aqueous silicate solution or the sodium borate solution.

Preferably, the composition is prepared by mixing:

(A) between about 0.05 and 5 percent by weight, based on the mass being treated, of an aqueous silicate solution, with about 5% to 15% potassium oxide and about 10% to 30% silicon dioxide; and (B) optionally, up to 5% by weight, based on the mass being treated, of a catalytic amount of an aqueous, up to 7% sodium borate solution having optionally up to 40 percent of a dispersing/lubricating agent contained therein; and (C) 5% to 100% by weight, based on the mass being treated, of a fixative of which a substantial portion is solid calcium oxide, wherein either solution (A) or (B) may optionally contain about 0.5 to 2.5% by weight of fumed silica.

DETAILS OF THE INVENTION

The composition in accordance with the invention will always include an aqueous silicate solution containing potassium oxide and silicon dioxide. More specifically, the silicate solution will include from 5 to 15 percent potassium oxide and from 10 to 30 percent silicon dioxide. The silicate solution is present in an amount between about 0.05 and 5 weight percent, based on the weight of the waste being treated and is referred to as component A or part A of the composition.

The composition will optionally include a catalytic amount of an aqueous sodium borate solution. The sodium borate solution contains up to 7 percent sodium borate and includes optionally up to 40 percent of a dispersing/lubricating agent. The sodium borate solution is present in an amount up to about 5 weight percent, based on the total weight of the waste being treated and is referred to as component B or part B.

The composition will also always include a fixative containing a substantial portion of calcium oxide. The fixative is present in an amount from about 5 weight percent to 100 weight percent based on the total weight of the waste being treated.

The dispersing/lubricating agent is an optional component of part B and is usually selected from glycerine, triethanolamine, and ethylene glycol, with glycerine being the preferred dispersing/lubricating agent.

A fumed silica may be added to either component A or B in an amount of about 0.5 to 2.5 percent.

In the practice of this invention, it is preferable to keep all parts of the composition separate until just before use. For example, it is normal to mix the high viscosity component A, containing silicate, in water and preferably, but optionally, to then add component B, containing borate, to the silicate solution. The fixative agent, containing calcium oxide, is added after the solid waste contaminant has been first wetted with Parts A, and optionally B, above. Alternatively, the catalyst, component B, which can be borax or boric acid with glycerine as a lubricant, is mixed in water and held separately. Either A or B can contain the fumed silica. Just prior to treating the solid waste, Parts A and B are mixed, diluted further if necessary, and applied to the soil by spraying or other convenient means. Alternatively, each part may be sprayed on the contaminated soil individually and mixed thereon by blending. The fixative is added after the waste has been treated with parts A and B.

Commercially, there are a host of areas generating high lead-in-soil or other toxic metal contaminated wastes. These include metal recovery facilities (e.g. auto scrap yards); lead smelting plants; paint processing facilities; etc. In these areas, lead is used or is generated by the recovery methods employed and this lead ends up in the waste and/or soil surrounding the facility.

From time-to-time, it is necessary to dispose of this contaminated waste or soil in an ecologically safe manner since human contact with the contaminated waste or soil is undesirable. In the past, it has been the practice of these industries to dispose of the waste and/or contaminated soil within various landfill sites. However, as more and more of these sites become filled, this procedure is ecologically unsound. As a result, there is a pressing need to find a quick, easy and economical method for treating the waste or soil which contains the contaminants so that the waste or soil may be disposed of without danger of leaching the contaminants into ground water. The composition of the invention is suitable for this purpose.

Other areas which contain solids contaminated with toxic metal pollutants and/or organic compounds, for example, are industries which attempt to reduce general pollutants by incineration. These industries incinerate the waste material first by volatilization and then by oxidation of the organic wastes. However, a solid ash remains, usually contaminated with toxic metals and the like. There is a pressing need here to dispose of these solids in an ecologically safe manner. The composition of the invention is suitable for this purpose as well.

In the practice of this invention, it is preferable to keep the parts separate. A solution of aqueous silicate, Part A, (e.g. Kasil-6, about 12.5% potassium oxide and about 26.3% silicon dioxide, viscosity of approximately 1050 centipoise, pH of 11.7, manufactured by PQ Corporation, Valley Forge, Pa.) along with some fumed silica (e.g. Cab-O-Sil, Cab-O-Sil Division of Cabot Corp., Tuscola, Ill.) that has already been dispersed with sufficient water to effect the desired dilution and which represents 0.5 to 2.5 percent by weight of Part A is first prepared.

The catalyst, Part B (e.g., an aqueous up to 7 percent sodium borate solution with a small amount (up to 40%) of dispersing/lubricating agent, e.g., glycerine) is also made up separately. Optionally, the catalyst solution may contain fumed silica in place of that present in Part A, above.

Just prior to use, the ingredients can be mixed. Alternatively, one may mix the ingredients within the soil to be treated. By keeping the various ingredients separate prior to use, premature reaction is prevented. Some dilution may be necessary in order that the mixture become sprayable. For example, dilution of the combined material of from about 1:1 to about 100:1 with water is useful. Spraying is a preferred mode of application although any mode can be used. The mixture is applied to the granulated soil or waste which is churned to expose all surfaces to the mixture.

It is desirable that the fixative agent, Part C (e.g., substantially solid calcium oxide, sold under the trademark POZZALIME by Mineral By-Products, Inc. of Dayton, Ohio) be added to the solid waste. This material should be added after the solid waste has been "wetted" by Parts A and, optionally, B. After drying, the solid yields much lower concentrations of leachable toxic metals and/or organic compounds and thus is suitable for disposal. Other sources of calcium oxide include, for example, cement, lime, kiln dust and fly ash.

EXAMPLE 1

To further illustrate this invention, the following solutions were prepared:

| Solution A: | |
|---|---|
| Silicate (about 12.5% potassium oxide and about 26.3% silicon dioxide, KASIL-6, PQ Corporation Valley Forge, PA) | 48.35 lbs |
| Water | 6.63 lbs |
| Fumed Silica (pre-dispersed in the water) | 0.50 lbs |

This solution was thoroughly mixed until uniform and, in volume, equaled about 5 gallons.

| Solution B: | | |
|---|---|---|
| Borax | | 120.0 g. |
| Glycerine | | 720.0 ml. |
| Water | to make | 5.0 gal. |

This solution was stirred until completely mixed.

| Part C: |
|---|
| Calcium Oxide (POZZALIME) 10% of mass being treated |

To use this material in accordance with the practice of this invention, a sample of waste was taken from an actual auto re-cycling plant. In this plant, used auto bodies are shredded in giant shredders to recover the metal. Since there is a large amount of lead associated with this recoverable metal, lead contamination is a large problem. The waste produced from this plant site becomes contaminated with the lead and must be treated and disposed of from time-to-time in order to protect workers who are associated with the environs of the plant site and to prevent the leaching of this lead into groundwater.

In this particular case, the contaminated waste was sieved to produce particles that will pass through a ⅜ inch diameter screen. The sieved waste was then passed along a conveyer belt and wet-down by spraying with a jet of a diluted solution consisting of equal quantities of Solutions A and B. The diluted solution was such that it consisted of 1/6 gallon of Solution A, 1/6 gallon of Solution B and 16⅔ gallons of tap water. This was sufficient to treat 1 ton of the contaminated waste. The wet-down waste was then treated with Part C in a ribbon blender until all of the material (waste, Solution A, Catalyst Solution B and Part C) were thoroughly mixed. An appropriate proportion of Part C (POZZALIME) was used so that 200 lbs. was sufficient to treat one ton of the contaminated waste. The final mixture was allowed to dry and then analyzed for soluble lead following the "California Assessment Manual, Criteria for Identification of Hazardous and Extremely Hazardous Wastes", draft of Jan. 11, 1984. In this case, the following results were achieved:

| SAMPLE | LEAD (mg/L) |
|---|---|
| Control - no treatment | 110.0 |
| Treated per above | 0.8 |

Therefore, soils and wastes contaminated with toxic metals such as lead can be treated with the composition of the invention and rendered safe for disposal with a minimal increase in volume and weight. This was not possible prior to the invention since wastes and soils contaminated with toxic metals became an environmental hazard and disposal thereof was considered to be an ecological problem. On the other hand, soil or waste contaminated with toxic metals such as lead and treated in accordance with the invention, can be safely handled since tests for leachable lead indicate that a low level is present. Moreover, disposal of this treated soil or waste is not a problem. Additionally, soils and wastes treated with the composition of the invention typically are found to have increased compressive strength and may be useful as construction materials.

EXAMPLE 2

In yet another example, toxic waste containing 40 mg/L of leachable lead was incinerated. Subsequently, the ash was treated with a mixture of the invention and then each sample was tested for the presence of lead. For control purposes, a sample of the toxic waste, which had not been oxidized by treatment in the incinerator, was also analyzed for lead content. In each case below, the silicate solutions and catalyst were made up as described in Example 1, above. The following results were obtained using the EP Toxicity Test published in the Federal Register, Vol. 49, No. 209, Oct. 26, 1984, or in EPA Publication SW 846, 2nd Edition, July, 1982, and in the proposed addition to SW 846, 1984:

| Sample No. | Treatment | Lead Analysis (mg/liter) |
|---|---|---|
| 1 | None - control | 40.0 |
| 2 | Oxidized only - Control | 17.0 |
| 3 | Oxidized, treated with 0.5 gal. silicate soln/ton waste, 0.5 gal. catalyst soln/ton waste, and 400 lb. POZZALIME/ton waste | 2.0 |
| 4 | Same as above but 1 gal. silicate soln/ton waste, 1 gal. catalyst soln/ton waste, and 400 lb. POZZALIME/ton waste | 1.2 |
| 5 | Same as above but 1.5 gal. silicate added/ton waste 1.5 gal. catalyst soln/ton waste, and 400 lb. POZZALIME/ton waste | 1.0 |
| 6 | Same as above but 0.5 gal. silicate soln/ton waste, 0.5 gal catalyst solution/ton waste, and 800 lb. POZZALIME/ton waste | 0.05 |

As is evident, the addition of a composition in accordance with the invention to already incinerated (oxidized) toxic waste reduced the lead to an almost insignificant level.

EXAMPLE 3

To demonstrate the efficacy of the inventive composition to encapsulate yet another toxic metal contaminant, a sample of waste contaminated with mercury having a starting level on the EP Toxicity Test of approximately 130 mg/L mercury, was treated with the following composition:

100 g. of waste contaminated with mercury
5 g. of Part A (KASIL-1, about 8.3% potassium oxide, and about 20.8% silicon dioxide, viscosity of approximately 40 centipoise, pH of 11.3)
5 g. of Part B (from a solution of 40 g. Borax and 240 ml glycerin, diluted with water to make 5.0 gallons).
60 g. POZZALIME.

After treatment, the level had dropped to 0.52 mg/L mercury. This constitutes a very significant drop indeed since mercury is a known poison and a very harmful contaminant in any material.

EXAMPLE 4

To further demonstrate the efficacy of the chemicals of this invention to encapsulate another toxic metal contaminant, a sample of waste contaminated with barium contained leachable barium in the amount of 400 mg/L on the EP Toxicity Test. After treatment with the following composition, the leachable barium dropped to 36.5 mg/L:

150 g. waste contaminated with barium
0.41 g. of Solution A (same as in Example 1)
0.32 g. of Solution B (same as in Example 1)
24.4 g. tap water
60 g. Air-Entraining Portland Cement Type IA (Keystone Portland Cement, Bath, Pa.)

EXAMPLE 5

The efficacy of the composition of the invention may yet be further demonstrated to encapsulate other toxic metal contaminants by treatment of a waste containing approximately 200 mg/L copper and 100 mg/L nickel based on an EP Toxicity Test. A sample of the waste was treated with the following chemicals:

1201 g. waste contaminated with copper and nickel
6.95 g. KASIL-6 (about 12.5% potassium oxide and about 26.3% silicon dioxide)
125 g. tap water
490 g. Air-Entraining Portland Cement, Type IA (Keystone Portland Cement, Bath, Pa.)

After treatment with the above chemicals, the EP Toxicity Test results gave less than 1 mg/L copper and less than 1 mg/L nickel in the leachate.

EXAMPLE 6

In still another example, kiln ash which contains 70.5 mg/L lead on the EP Toxicity Test was treated with the chemicals in this invention as follows:

400 g. kiln ash contaminated with lead
1.10 g. of Solution A (same as in Example 1)
0.84 g. of Solution B (same as in Example 1)
64.86 g. tap water
160 g. lime, Type S (Genstar Cement and Lime Co., San Francisco, Calif.)

After treatment, the leachable lead was reduced to less than 0.2 mg/L, thus illustrating the efficacy of this invention.

EXAMPLE 7

This was the same composition as described in Example 6 except that 160 g. POZZALIME was used in place of the lime. After this treatment, the results on the EP Toxicity Test were reduced from 70.5 mg/L lead (before treatment) to less than 0.2 mg/L lead (after treatment).

EXAMPLE 8

This was the same composition as described in Example 6 except that 160 g. portland cement, Type IA, (from Keystone Portland Cement, Bath, Pa.) was used in place of the lime. The results based on the EP Toxicity Test before treatment gave 70.5 mg/L lead, whereas after the treatment leachable lead was only 0.5 mg/L.

EXAMPLE 9

Another demonstration of the efficacy of the composition of the invention is based on the results of secondary blast furnace slag containing 2.23% lead by assay being treated with the following composition:

- 200 g. secondary blast furnace slag contaminated with lead
- 0.58 g. of KASIL-6
- 0.42 g. of Solution B (same as in Example 1)
- 32.3 g. tap water
- 80 g. portland cement, Type IA (Keystone Portland Cement, Bath, Pa.)

After treatment with the above composition, the leachable lead on the EP Toxicity Test was 0.6 mg/L.

EXAMPLE 10

This experiment was the same as Example 9 except that 80 g. lime, Type SA (from Corson Lime Co., Plymouth Meeting, Pa.) was used instead of Portland Cement. After treatment with this composition, the lead extracted on the EP Toxicity Test was 0.5 mg/L.

EXAMPLE 11

The efficacy of the invention may further be demonstrated by the following treatment of foundry sand, which gave on the CAM "WET" Test: 185 mg/L lead, 2400 mg/L zinc, and 304 mg/L copper. The foundry sand was treated as follows:

- 800 g. foundry sand contaminated with lead, zinc and copper
- 2.30 g. KASIL-6
- 1.67 g. Solution B (same as in Example 1)
- 129.6 g. tap water
- 320 g. POZZALIME After the above treatment, the results of the CAM "WET" Test were: 4.0 mg/L lead, 26 mg/L zinc, and 111 mg/L copper.

EXAMPLE 12

A demonstration of the efficacy of the composition of the invention for encapsulating PCB's in contaminated waste follows. Incinerator ash containing 552 ppm PCB's as analyzed by Methods 3550 and 8080 in EPA Publication SW 846, 2nd Edition, July, 1982, and in the proposed addition to SW 846, 1984, was treated with the following composition:

- 400 g. of incinerator ash contaminated with PCB's
- 1.16 g. of Kasil-6
- 0.84 g. of Solution B (same as in Example 1)
- 64.8 g. tap water
- 320 g. portland cement, Type IA (Keystone Portland Cement, Bath, Pa.)

After treatment with this composition, the PCB analysis gave 65 ppm PCB's, thus reducing the PCB's in the leachate by 88 percent.

It is thus seen that the objects set forth above, among those apparent from the preceding description, are efficiently attained and, since changes may be made in carrying out the above process and in the composition set forth without departing from the spirit and scope of the invention, it is intended that all matter contained herein shall be interpreted as illustrative and not in a limiting sense.

It is also understood that the following claims are intended to cover all of the generic and specific features of the invention and all statements of the scope thereof which, as a matter of language, might be said to fall there-between.

Particularly, it is understood that ingredients or compounds recited in the singular are intended to include compatible mixtures wherever appropriate.

What is claimed is:

1. A composition for encapsulating solid waste or sludge comprising:
   an aqueous silicate solution in an amount between about 0.05 and 5 weight percent, said silicate solution comprising between about 5 and 15 percent potassium oxide and between about 10 and 30 percent silicon dioxide; and
   a fixative in an amount between about 5 and 100 weight percent, said fixative comprising a substantial portion of calcium oxide, wherein the weight percents are based on the waste or sludge being treated.

2. The composition of claim 1, further comprising a catalytic amount of an aqueous sodium borate solution in an amount up to about 5 weight percent, said sodium borate solution comprising sodium borate in an amount up to about 7 percent.

3. The composition of claim 2, wherein said sodium borate solution further comprises a dispersing/lubricating agent in an amount up to about 40 percent.

4. The composition of claim 2, wherein at least one of said aqueous silicate solution and said catalytic amount of an aqueous sodium borate solution further includes between about 0.5 and 2.5 percent of a fumed silica.

5. The composition of claim 3, wherein the dispersing/lubricating agent is selected from the group including glycerine, triethanolamine, and ethylene glycol.

6. The composition of claim 2, wherein the viscosity of said aqueous silicate solution is between about 7 and 1050 centipoise at 20 degrees Celsius.

7. The composition of claim 1, wherein said fixative comprises substantially solid calcium oxide.

8. The composition of claim 7, wherein said substantially solid calcium oxide is selected from the group including cement, lime, kiln dust, fly ash and Pozzalime.

9. A process for treating waste contaminated with at least one of toxic metals and organic compounds, wherein said process comprises the steps of:
   spraying said waste with an aqueous silicate solution in an amount between about 0.05 and 5 weight percent, said silicate solution comprising between about 5 and 15 percent potassium oxide and between about 10 and 30 percent silicon dioxide; and
   mixing said waste with a fixative material in an amount between about 5 and 100 weight percent, said fixative material comprising a substantial portion of calcium oxide, wherein said weight percents are based on the waste being treated.

10. The process of claim 9, wherein said spraying step further comprises spraying said waste with an aqueous sodium borate solution in an amount up to about 5 weight percent, said borate solution comprising sodium borate in an amount up to about 7 percent.

11. The process of claim 10, wherein said sodium borate solution further comprises a dispersing/lubricating agent in an amount up to about 40 percent.

12. The process of claim 10, wherein said silicate solution and said sodium borate solution are diluted from about 1:1 to about 100:1 before said spraying steps.

13. The process of claim 10, wherein a fumed silica is added to at least one of said silicate solution and said borate solution before said spraying steps.

* * * * *